United States Patent
Cassel

[15] 3,653,696
[45] *Apr. 4, 1972

[54] LAMINATED PIPE EXHAUST CONDUIT WITH LOW PRESSURE SEAL JOINT

[72] Inventor: Thomas R. Cassel, Birmingham, Mich.

[73] Assignees: Kenneth W. Cassel, Jr., Cincinnati, Ohio; R. Nelson Cooksey, Indianapolis, Ind.; Keevin J. Cassel, Union Lake, Mich.; William E. Neighbors, Petersburg, Fla., part interest to each

[ * ] Notice: The portion of the term of this patent subsequent to Mar. 30, 1988, has been disclaimed.

[22] Filed: Nov. 18, 1969

[21] Appl. No.: 877,742

[52] U.S. Cl.............................285/403, 138/140, 287/126
[51] Int. Cl............................................................F16l 39/00
[58] Field of Search.....................285/382, 382.1, 403–406, 285/382.2, 424, 400, 420, 330, 407, 410, 199, 149; 29/523, 525, 526, 426; 211/182; 52/726; 272/60, 56.5; 287/54 A, 54 B, 54 C, 109, 189.36 C, 189.36 D, 189.36 F, 58 CT, 58, 103, 104, 119; 138/140, 147, 153, 149

[56] References Cited

UNITED STATES PATENTS 2,479,483 8/1949 Eckleberry..........................285/53 X
3,479,621 11/1969 Martin...............................138/140 X Primary Examiner—David J. Williamowsky
Assistant Examiner—Wayne L. Shedd
Attorney—Barnard, McGlynn & Reising

[57] ABSTRACT

An exhaust conduit for automotive internal combustion engines is disclosed wherein a low-pressure seal joint between pipe sections is used with a laminated pipe to avoid failures of the laminated pipe which have been experienced with prior art joints. The laminated pipe includes at the interface of the laminations a residual quantity of oil-like material which is used in the manufacturing process. When used in an exhaust system with a high-pressure seal joint the material vaporizes under the influence of the hot exhaust gases and the vapor pressure thereof causes separation of the laminations, collapse of the inner lamination or other failure of the pipe. A low-pressure seal over a band of engagement in the joint is effective to prevent leakage of the exhaust gases and at the same time to allow vaporized material between the laminations to escape through the end of the laminated pipe.

9 Claims, 4 Drawing Figures

PATENTED APR 4 1972 3,653,696

INVENTOR.
Thomas R. Cassel
BY
Barnard, McGlynn & Reising
ATTORNEYS

LAMINATED PIPE EXHAUST CONDUIT WITH LOW PRESSURE SEAL JOINT

This invention relates to exhaust systems for automotive vehicles and, more particularly, to a joint or coupling for use with a laminated pipe.

In automotive vehicles it is common practice to provide an exhaust system for the internal combustion engine with a conduit including mufflers and other sound attenuating devices extending or disposed beneath the chassis or frame of the vehicle. Such conduits, for the purpose of enhancing the sound attenuating function of the exhaust system, commonly are formed with laminated pipe. Such pipe is known to have sound deadening qualities as compared to single wall pipe and may be used in selected portions or throughout the exhaust system for conducting the exhaust gases from the engine manifold to the atmosphere.

Heretofore, it has been the practice to connect the components of the exhaust system together by joints between adjacent pipe sections using the well known U-bolt clamp. In this joint the end of one pipe section is inserted into the end of the other and the U-bolt clamp is tightened sufficiently to compress the wall of the outer pipe section against the wall of the inner pipe section so that the joint is sealed against leakage of exhaust gases. The seal produced by this construction is formed of a circumferential line engagement between the wall of the outer pipe section and the wall of the inner pipe section under the contacting portions of the U-bolt clamp.

This prior art construction including laminated pipe has given rise to an unusual problem in the use of such exhaust systems. The problem arises due to a combination of factors, one of which is the joint with a high-pressure seal produced by the U-bolt clamp. Another contributing factor arises from the manufacturing process for the laminated pipe. In the manufacture of such pipe a liquid material such as an oil is applied to the surfaces of the sheet metal in forming the laminations of the wall of the pipe. A residual quantity of the material is retained as a film at the interface of the laminations when the pipe seam is formed and thus remains trapped or entrained with no opening to the atmosphere except through the ends of the pipe. When the pipe is put into use in an exhaust system with a joint forming a high-pressure seal at the end, the hot exhaust gases are effective to heat the pipe to a very high temperature in short time and thereby vaporize the material between said laminations. Since there is no expansion volume between the laminations and no low-pressure vent for the vapor, very high pressures will be produced thereby in a short period of time. The result is to produce a failure in the laminated pipe, usually by collapsing the inner lamination in a manner that obstructs the passage of exhaust gas through the pipe. Such failures generally occur at a weakened section where there is a local defect or deformation in the laminated pipe. The problem is thus aggravated by an installation which requires a flat section in the pipe to provide clearance for a frame member or other component in the underbody of the vehicle.

Heretofore, this problem in the use of laminated pipe has not been satisfactorily solved. It is noted, of course, that the vapor between the laminations could be vented by providing perforations in the wall of the pipe. Such perforations, however they may be formed or located, are highly undesirable because they result in a shortened useful life of the pipe.

The problem is solved in accordance with this invention by providing a joint for laminated pipe in an exhaust system which provides a low-pressure seal effective to prevent leakage of the exhaust gases and to allow the vaporized material between the laminations to escape through the end of the laminated pipe. This is accomplished by a joint in which the end of one pipe is stretched around the other so that the flow path for the vapor to the end of the laminated pipe is constricted only by the forces in the laminations resulting from the stretched end of the outer pipe. In such a joint the outer pipe is in tensile stress and the inner pipe is in compressive stress over a band of engagement extending around the pipes and forming a low-pressure seal throughout the band. The joint may utilize fastening means connected between the inner and outer pipes which maintains said band of engagement and the force applied thereby is distributed over the area of the band of engagement. A screw-threaded fastening means may be employed together with means for distributing the force thereof over a desired area to obtain the low-pressure seal against exhaust gases while permitting escape of high pressure vapors from between the laminations. A pipe joint of this type is disclosed and claimed in copending application Ser. No. 837,985, filed May 26, 1969, by Thomas R. Cassel and assigned to the assignee of the present invention.

A more complete understanding of the present invention may be obtained from the detailed description which follows taken with the accompanying drawings in which.

Figure 1:
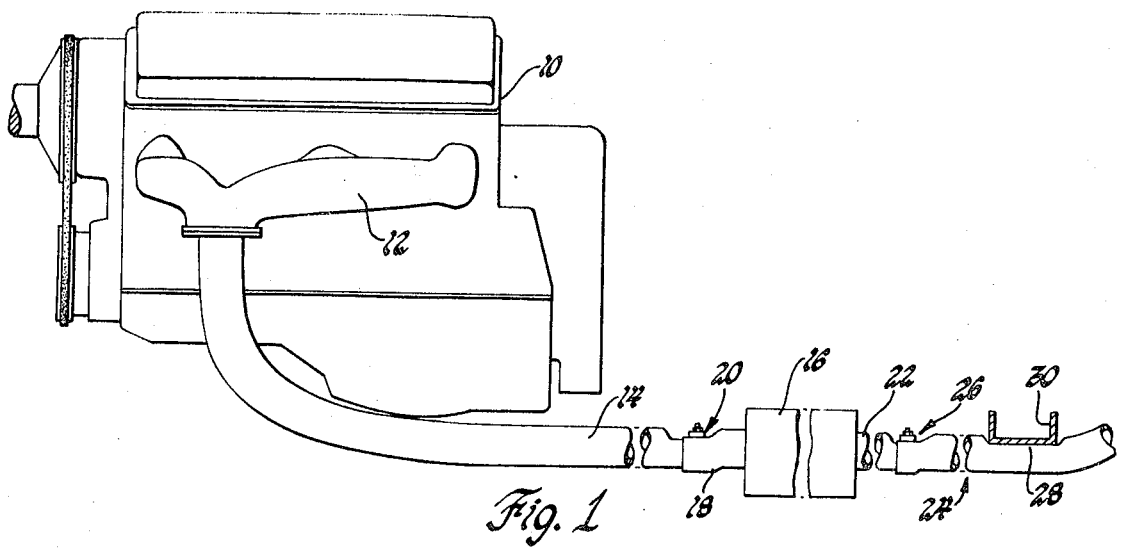
FIG. 1 shows a typical exhaust system for an internal combustion engine in which the subject invention is embodied.

Referring now to FIG. 1, there is shown an embodiment of the invention in a typical vehicle exhaust system for an automotive vehicle. The engine 10 has an exhaust manifold 12 with an exhaust pipe 14 extending therefrom to a muffler 16 which is located beneath the body of the vehicle. The exhaust pipe 14 is connected to the inlet pipe 18 of the muffler by a coupling or joint 20 in accordance with the present invention. The outlet pipe 22 of the muffler is connected to a tail pipe 24 which extends to the rear of the vehicle and discharges the exhaust gases into the atmosphere. The tail pipe 24 and the outlet pipe 22 are connected together by a coupling or joint 26 in accordance with the present invention. The tail pipe 24 is provided with a flat section 28 to provide clearance from a frame member 30 of the vehicle underbody.

The exhaust pipe 14, muffler 16 with inlet and outlet pipes 18 and 22, respectively, and the tail pipe 24 constitute an exhaust conduit for the exhaust gases from the engine 10. Accordingly, the exhaust pipe 14, the inlet pipe 18, the outlet pipe 22 and the tail pipe 24 are sometimes referred to as exhaust pipe sections or simply as pipes or pipe sections. Any one of these pipe sections or other pipe sections in a vehicle exhaust system may be constructed of laminated pipe. As is well known, the pipe sections of such an exhaust system for the internal combustion engine of an automotive vehicle operate at high temperatures which are reached very quickly after starting of the engine. The temperatures of the pipe sections will vary in accordance with the distance from the exhaust manifold, but even the rearmost pipe sections, such as tail pipe 24, will operate at temperatures of several hundred degrees. In the illustrative embodiment of the invention as shown in FIG. 1 the exhaust pipe 14 is constructed of laminated pipe while the inlet pipe 18 is a single layer pipe and the joint 20 is constructed in accordance with this invention. Similarly, the tail pipe 24 is of laminated construction. The outlet pipe 22 is of single layer construction and the joint 26 is constructed in accordance with this invention. A detailed description of the joint 26 with the laminated pipe 24 will be given with reference to FIGS. 2, 3, and 4.

Figure 2:
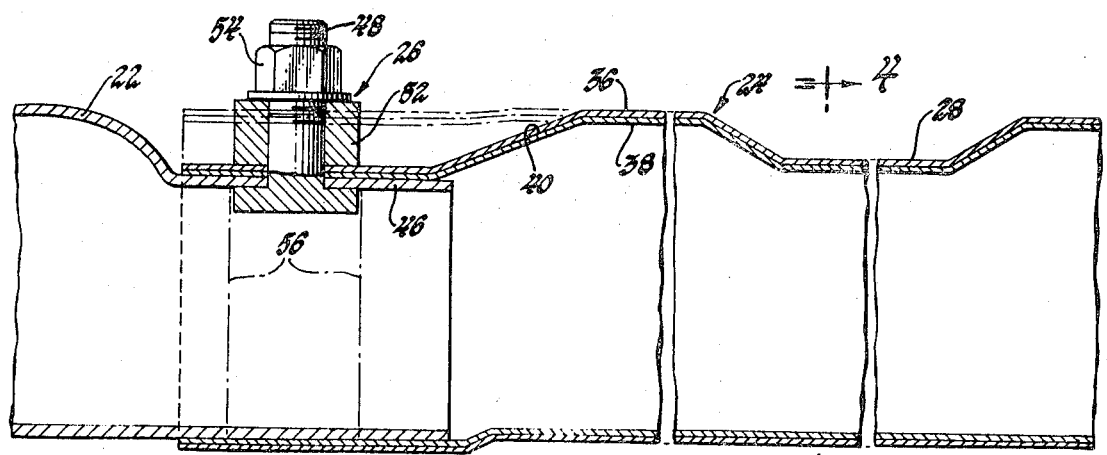
FIG. 2 shows an exhaust conduit embodying the present invention.

Referring now to FIG. 2, the coupling or joint 26 between the muffler outlet pipe 22 and the tail pipe 24 is shown in detail. Before proceeding with the detailed description of the joint 26, reference is made to the laminated construction of the tail pipe 24. It will be observed that the laminated pipe comprises an outer layer 36, an inner layer 38, both of which are of tubular form with an intimate and substantially continuous engagement between the inner and outer surfaces, respectively, forming an interface 40. At the interface 40, i.e., on the opposed surfaces of the laminations 36 and 38, there is disposed a quantity of liquid which remains from the manufacturing process for the laminated pipe. In such manufacturing process a pipe is formed of sheet metal such as a low-carbon steel by forming one strip in an inner-tubular form and concurrently forming another strip in an outer-tubular form about the innergtubular form. In this forming process an oil-like liquid is applied to the surfaces of the sheet metal strips and a residual quantity is enveloped between the laminations when the tubular forms are closed together. As the tubular forms are closed, the seams thereof are joined in a continuous manner by a welding operation. In such a manufacturing process the outer lamination of the laminated pipe may be placed in tension over the inner lamination whereby residual tensile and compressive stresses, respectively, are effective to maintain intimate contact or engagement between the inner and outer laminations. The liquid material used in the manufacturing process is of such composition that it has a boiling point which is substantially below the temperatures achieved in the operation of an exhaust system of an internal combustion engine. The specific composition is of no significance in the practice of the present invention, but one known liquid used in the manufacture of laminated pipe is known as a water soluble oil, identified as an EP coolant. It is to be noted that there is no vent for the liquid or vapors thereof except through the end of the laminated pipe.

Figure 4:
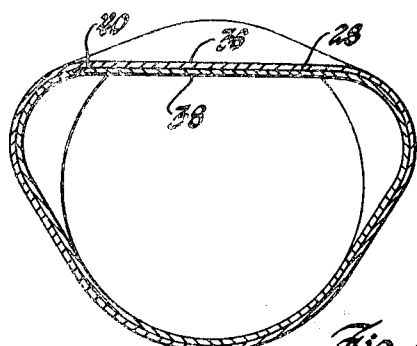
FIG. 4 is a sectional view taken on lines 4—4 of FIG. 2.

It is noted with reference to FIGS. 2 and 4 that the pipe 24 may include deformations such as the flat section 28 which, as described above, is provided for clearance from a vehicle body member. The laminations 36 and 38 tend to separate at the flat section 28 and because of the configuration such a section may be most susceptible to failure by collapse of the inner lamination. It can be seen that the flat section will offer less resistance to vapor pressure between the laminations than the circular section of the pipe. Laminated pipe thus tends to fail by collapse of the inner lamination under the influence of vapor pressure between the laminations at such sections or other local irregularities in the configuration.

The joint 26 is adapted to provide a mechanical interconnection between the pipe 22 and the laminated pipe 24. Additionally, the joint is adapted to provide a seal against the leakage of exhaust gases passing through the conduit formed by the pipe sections 22 and 24. Additionally, in accordance with the invention, the joint 26 provides a flow path through which vapor between the laminations 36 and 38 may reach the end of the pipe section 24 and the vent to the atmosphere provided thereby.

Figure 3:
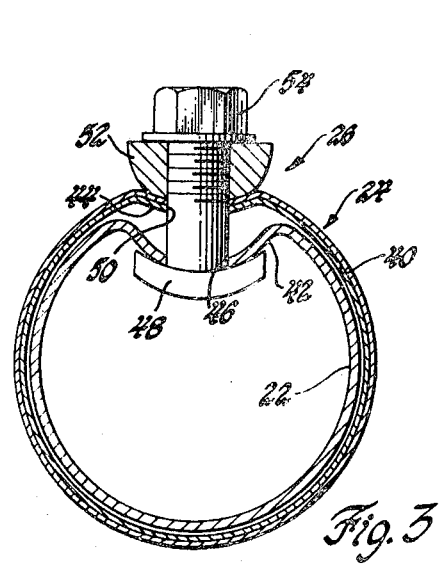
FIG. 3 is a cross-sectional view of parts in position to form a joint.

Referring now to FIG. 3, the parts of the joint 26 are shown in cross-section before the pipes are drawn into engagement. The pipe section 22 is provided with an inwardly extending deformation 42 adjacent its end and is inserted into the end of pipe section 24 which is also provided with an inwardly extending deformation 44. It is to be noted that the peripheral length of the outer surface of the end of pipe section 22 is at least as great as, and maybe greater, than the peripheral length of the inner surface of the end of pipe section 24. The pipe section 22 at the bottom of the deformation 42 defines a slot 46 extending from the end thereof. Fastening means in the form of a screw-threaded fastener or bolt 48 has a head portion disposed within and conforming to the deformation 42 of the pipe section 22 and a shank portion which extends through the slot 46 and through an opening 50 in the deformation of the outer pipe section 24. An elongated washer 52 is disposed over the shank of the threaded fastener and a nut 54 is threadedly engaged with the shank of the fastener. When the nut 54 is tightened on the bolt 48 the ends of the pipe section 22 and pipe section 24 are drawn together until the deformation 44 is in engagement with the deformation 42. Consequently, the end of pipe section 24 is stretched or placed in tensile stress and the end of pipe section 22 is placed in compressive stress. There is produced a band of surface engagement between the outer surface of the pipe section 22 and the inner surface of pipe section 24 which extends around the ends of the pipes.

This condition is illustrated in FIG. 2 and it is to be noted that the force exerted by the bolt 48 is distributed over the band of engagement indicated as the area between the dashed lines 56. This band has a width which corresponds with the axial length of the washer 52 which distributes the force so that relatively low tensile stress is produced throughout the band in the pipe section 24 and relatively low compressive stress is produced throughout the band in the pipe section 22. It is further noted that the joint 26 is constructed so that the overlap length of the pipe section 22 and the pipe section 24 is approximately equal to the diameter of the pipes. The length of the washer 54 and hence the width of the band of engagement, as indicated by dashed lines 56, extends over a substantial part, approximately one-half, of the length of the overlap. In this construction the band of engagement extending around the pipe sections forms a low-pressure seal effective to prevent leakage of exhaust gases. Furthermore, the stresses in the ends of said pipe sections are of such low value that the vapor formed between the laminations in pipe section 24 are provided a low-pressure flow path through the band of engagement to the end of the pipe section which provides a vent to the atmosphere. Consequently, the pressure of the vapor is limited by the values of stress in the laminations and will not reach such high values as are required to produce a failure of the laminated pipe by collapsing the inner lamination thereof or otherwise deforming or separating the laminations.

It will now be appreciated that the invention provides a joint for pipe sections in an exhaust system of an automotive vehicle which may be used with laminated pipe of the type having a residual quantity of liquid or other material at the interface of the lamination which will produce a high vapor pressure at the operating temperature. The invention provides in combination with such laminated pipe a low-pressure seal over a band of engagement which is effective to prevent leakage of exhaust gases and which serves as a low-pressure flow path for the vapor between the laminations through the joint to the end of the laminated pipe and the vent provided thereby.

Although the description of the invention has been given with respect to a particular embodiment thereof, it is not to be construed in a limiting sense. Many variations and modifications within the spirit and scope of the invention will now occur to those skilled in the art. For a definition of the invention reference is made to the appended claims.

The embodiments of the invention in which an exclusive property or privilege is claimed are defined as follows:

1. An exhaust conduit for a vehicle engine comprising first and second pipe sections, one of the pipe sections being formed of laminated pipe of the type including a quantity of material at the interface of the laminations, said material being subject to vaporization by the heat of the engine exhaust gases thereby producing high vapor pressure between said laminations thereby tending to separate the laminations, the first pipe sections having its end inserted into the end of the second pipe section to form a joint, the ends of said first and second pipe sections being in engagement and in a state of compressive and tensile stress, respectively, said engagement extending around said pipe sections to seal said joint against substantial leakage of exhaust gases whereby the pressure of the vaporized material between said laminations is limited by the stress in the laminations and the vapor will escape through the end of said one of said pipe sections.

2. An exhaust conduit for a vehicle engine comprising first and second pipe sections, one of the pipe sections being formed of laminated pipe of the type including a quantity of material at the interface of the laminations, said material being subject to vaporization by the heat of the engine exhaust gases thereby producing high vapor pressure between said laminations tending to separate the laminations, the first pipe section having its end inserted into the end of the second pipe section to form a joint, fastening means connected between said ends to hold said ends together throughout a band of engagement with the end of the second pipe section being in tensile stress, said band of engagement extending around said pipe sections and forming a low-pressure seal effective to prevent substantial leakage of exhaust gases, said stresses being of such low value that the vaporized material between the laminations will escape through the end of the pipe section formed of laminated pipe rather than deforming the laminations thereof.

3. An exhaust conduit for a vehicle engine comprising two pipe sections, one of which is formed of laminated pipe of the type including a quantity of material at the interface of the laminations, said material being subject to vaporization by the heat of the engine exhaust gases thereby producing high vapor pressure between said laminations tending to separate the laminations, one of the pipe sections having its end stretched around the end of the other pipe section to form a joint, whereby vaporized material between the laminations has a flow path to the end of the laminations which is constricted only by the forces in said laminations resulting from said stretched end.

4. An exhaust conduit for a vehicle engine comprising two pipe sections, one of which is formed of laminated pipe of the type including a quantity of material at the interface of the laminations, said material being subject to vaporization by the heat of the engine exhaust gases thereby producing high-pressure vapor between said laminations tending to separate the laminations, one of the pipe sections having its end inserted into the end of the other pipe section to form a joint, fastening means connected between said ends and exerting a force therebetween and maintaining said ends in surface engagement with compressive stress in the end of the first pipe section and tensile stress in the end of the second pipe section, said force being distributed over said surface engagement to form a low-pressure seal against leakage of exhaust gases and adapted to permit vaporized material between said laminations to escape through the end of the pipe section formed of laminated pipe.

5. The invention as defined in claim 4 wherein said fastening means includes an elongated member in engagement with one of said pipe sections for distributing said force over an axial length thereof and around the end of said pipe sections.

6. The invention as defined in claim 4 wherein the pipe section having its end inserted into the end of the other pipe section is provided with an inwardly extending deformation in the end thereof, said fastening means being connected between said ends at said inwardly extending deformation whereby said force draws the ends of said pipe sections together to produce said surface engagement.

7. The invention as defined in claim 6 wherein said fastening means comprises a screw-threaded fastener extending through the ends of said pipe sections and through said inwardly extending deformation whereby said joint is formed by tightening said screw-threaded fastener.

8. The invention as defined in claim 7 wherein an axially elongated washer is disposed between one end of said screw-threaded fastener and said ends of said pipe sections whereby said force is distributed throughout a band of engagement between the ends of said pipe sections.

9. The invention as defined in claim 8 wherein the ends of said pipe sections overlap each other an amount approximately equal to the diameter of said pipe sections and wherein said inwardly extending deformation extends substantially throughout the length of said overlap, said axially elongated washer having a length which is a substantial fraction of length of said deformation whereby said force is distributed over a band corresponding thereto.

* * * * *